Sept. 26, 1939.  D. N. SHARMA  2,173,863
AIRCRAFT NAVIGATION SYSTEM
Filed Nov. 21, 1936   2 Sheets-Sheet 1
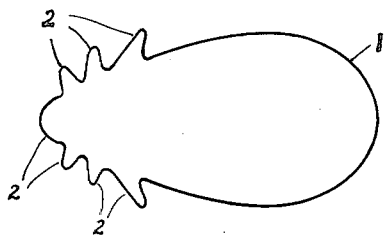
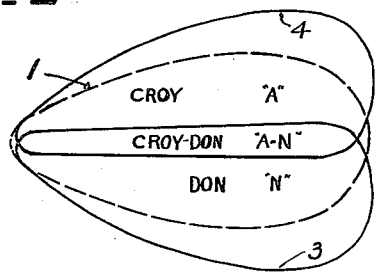
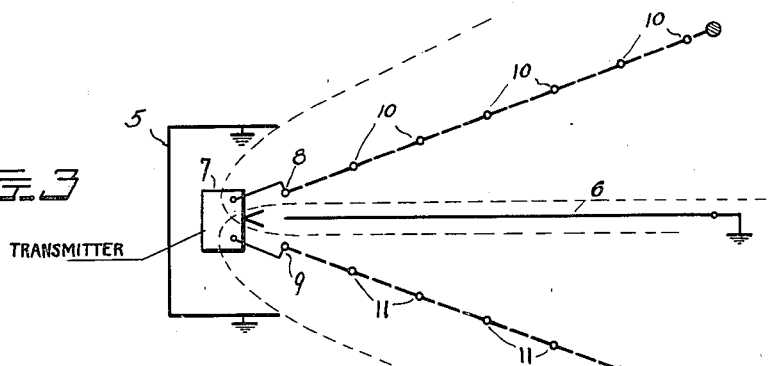
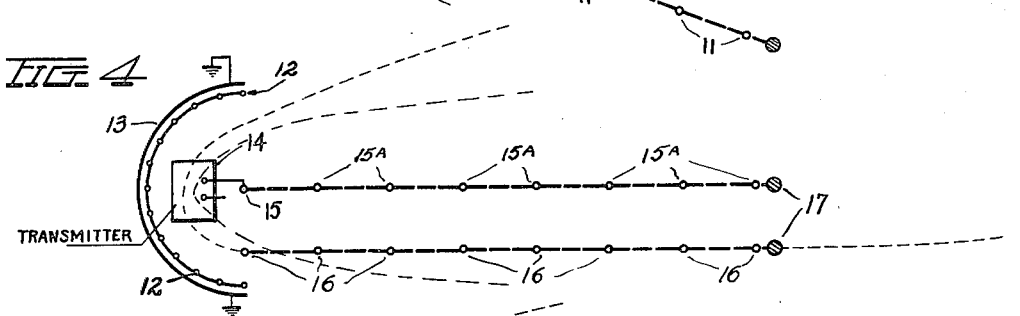
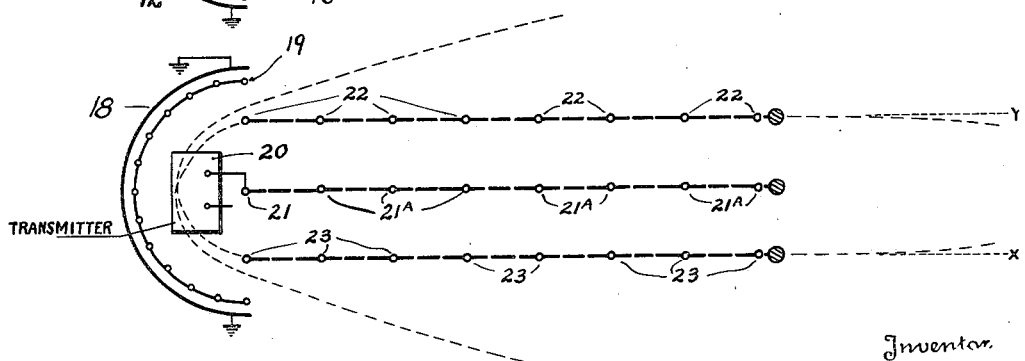
Inventor.
DEVENDRA N. SHARMA,
By John B. Brady.
Attorney

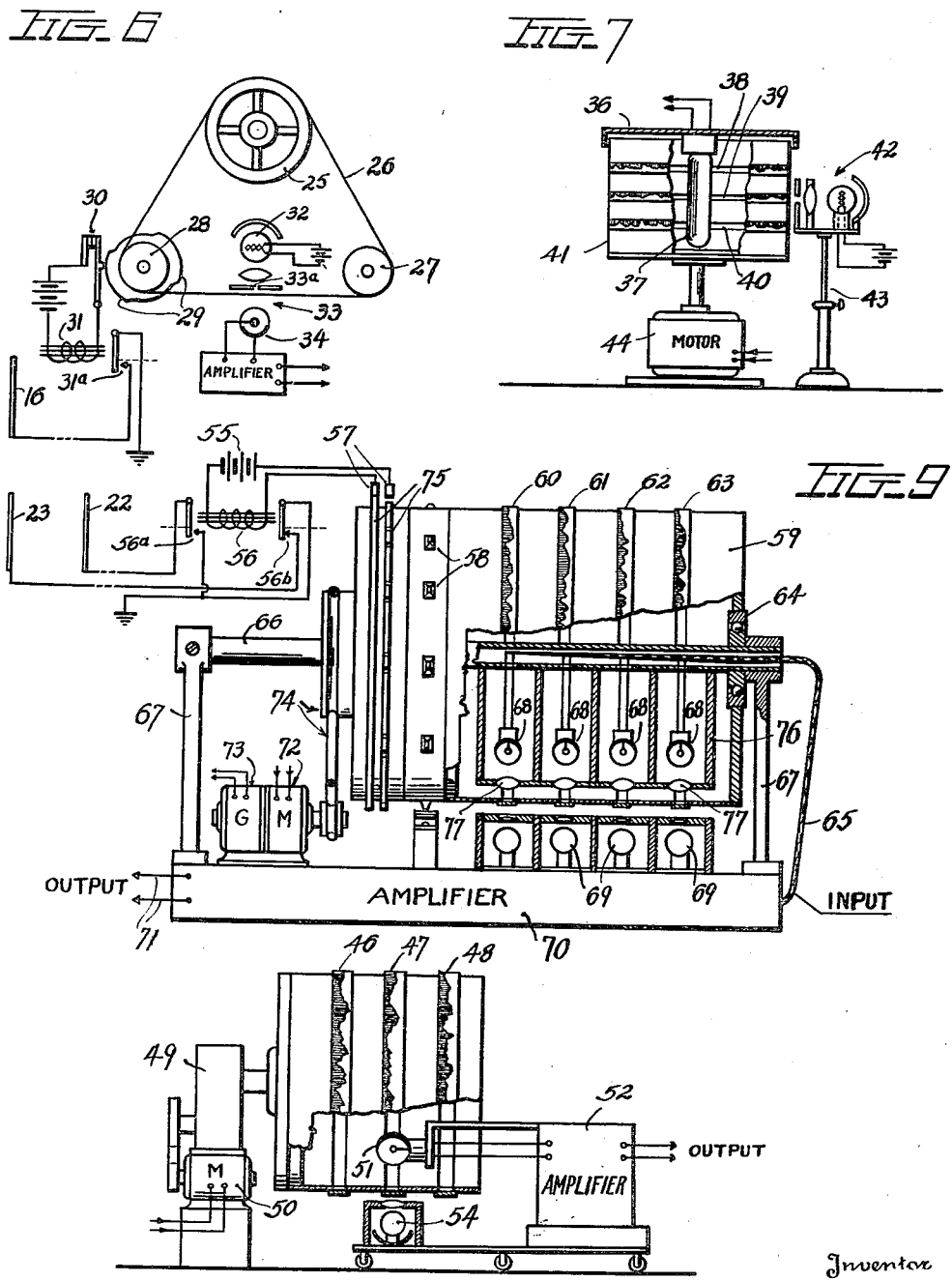

Patented Sept. 26, 1939

2,173,863

UNITED STATES PATENT OFFICE 2,173,863

AIRCRAFT NAVIGATION SYSTEM

Devendra Nath Sharma, London, England

Application November 21, 1936, Serial No. 112,182
In Great Britain November 21, 1935

3 Claims. (Cl. 250—11)

This invention relates to the propagation of ultra-short and micro-wave electromagnetic radiation in the shape of a directional beam formation to be used in communication navigation signalling and specially for guiding aircraft and ships during bad visibility.

One of the main features of the invention relates to the means for the propagation of a well defined beam without or with extensively suppressed back-radiation additional beam formations, or fringes, and to produce on the beam possessing substantially one straight edge i. e., the formation of a lop-sided or deformed beam, which can be used to a great advantage especially in blind landing and blind approach systems. This feature will become more apparent as the specification progresses.

Another important feature of the invention relates to the means for the formation of the so-called equisignal path or corridor along which the approaching aircraft or ships approach the port.

In all known systems interlocked Morse signals are utilized which interlock in the equisignal path to render a continuous note.

In this invention, however, the unique feature lies in the division of the name of the port the ship is approaching into two parts. Thus for example, Croydon would be split into its phonic constituents "Croy" and "Don". The syllable "Croy" would be transmitted to the right side, while the syllable "Don" would be transmitted on the left side. So that when the pilot is heading directly towards the port along the central approach corridor he hears the name of the station, i. e. "Croydon," which gives him the indication that not only is he on the central approach zone but also proceeding towards Croydon.

Other features will become apparent from the specification hereinafter following.

Referring to the accompanying diagrams, Figure 1 represents the usual beam formation by using directional aerial arrays; Fig. 2 indicates the method of employing two deformed or lop-sided beam formations according to this invention for creating a central approach corridor; Fig. 3 shows a form of two arrays in plan view which may be used for the formation of approach zone with suppressed back-radiation; Fig. 4 indicates the formation of a lop-sided or a deformed beam by a directional array with a minimum of, or no back-radiation; Fig. 5 represents a plan view of an array for the formation of a central corridor by superimposing two deformed beams with a minimum of back-radiation; Fig. 6 shows diagrammatically the modulating arrangement as well as electromagnetic arrangement for rendering the side screens effective; Fig. 7 indicates a drum arrangement for modulating the transmitted signals; Fig. 8 represents a modified form of the arrangement shown in Fig. 7; and Fig. 9 indicates a further modified arrangement for modulating the transmitted electromagnetic energy and for connecting the side screens in such manner as to constitute reflector-absorbers or co-resonators.

Extensive experiments were conducted by the very kind permission of the British Air Ministry on Croydon aerodrome for the directional propagation of electromagnetic radiation for use in blind approach and blind landing systems.

Various types of reflector arrangements such as three-wire trigonal, four-wire trapezoidal, plane, parabolic, two wire, single wire and underground emplacements were experimented with in conjunction with various directional arrays in order to suppress the back-radiation and to produce the beam and its polar or space pattern in a definite well defined shape and sector, preferably of a lop-sided or one straight edged formation.

My invention achieves the aforesaid requirements with micro-rays and a closed or a specially shaped parabolic reflector or side screens.

However, when the wave lengths from ten metres down to five metres are taken into consideration, a closed type of reflector, due to tremendous absorption of radiation at these high frequencies, the dimension of the surrounding reflector-absorbers, and similar constructional considerations, cannot be utilized with a great advantage.

Means were, therefore, devised to enable the use of longer wavelengths and yet achieve the objects set out without any unnecessary employment of large absorption screens, large parabolic structures and high aerial arrays.

The requirement, therefore, was to create a beam 1, as shown in Fig. 1 but without any fringes or back-radiation such as at 2, 2, 2, 2.

Moreover, it was considered a distinct advantage to employ a lop-sided or deformed beam with one straight side, while the other side was of the usual beam curvature, and to superpose or transmit these beam formations with careful adjustments of the aerial array axis, whereby it would be possible to form an approach corridor of a fairly even width and at the strongest part of the two superposed beam formations.

Such a combined arrangement is indicated in the polar diagram in Fig. 2, wherein 3 and 4 indicate the two deformed beams forming a central approach corridor at the strongest part of the two beam formations. The broken line 1 on Fig. 2 represents the field formation obtained normally, as in Fig. 1, by a directive antenna without deflective or deformative means.

Referring to Fig. 3, 5 indicates an earthed absorption reflector screen made out of wire netting or several metal rods. 7 indicates one or two transmitters coupled to the main radiators 8 and 9 which, employed in conjunction with resonators 10, 10, 10, 10, and 11, 11, 11, 11, respectively, which may be rendered effective or ineffective alternately, and which are set at an angle of about 30°, produce two overlapping beam formations.

A central absorption screen 6, may be also used, while arrays 8—10 and 9—11 represent any form of directional arrays or those as referred to in my British Patent No. 469,775.

Referring to Fig. 4, of the accompanying diagrams, 12, 12 represent diagrammatically a parabolic or a similar semi-circular structure made out of metal rods, netting, sheet, or metallized discharge tubes, which may be given a high voltage bias or fed with alternating currents. This structure may be further surrounded by an earthed wire gauze or metal screen 13. 14 indicates the transmitter feeding the main radiator 15 (fed by any known method). 15A, 15A, 15A, 15A indicate the directional array such as that referred to in the British Patent No. 469,775 or any well known aerial array.

17, 17 indicate the supportive poles for the cables supporting the vertical resonators and radiators, and the reflective side screens made out of metal rods 16, 16, 16, and positioned about ¼ to ½ wavelength distant from the main beam array 15—15A.

The length of the reflective absorbing screen rods 16 is equal to or slightly smaller than that of the main array rods 15—15A; i. e., rods 16 are capable of resonating at a higher frequency and are normally resonant with the energy radiated. By suitable switching means (Figs. 6 and 9) these rods 16, 16 may be grounded and converted into reflectors, whereby a deformed beam with one straight edge and a minimum of back-radiation will be projected, the aperture ranging from ⅘ to one wavelength or slightly more, which is quite suitable for this type of installation.

Referring to Fig. 5, an array similar to the array as indicated in Fig. 4 is shown with an additional side screen 22—22 situated at a distance equal to the distance of the side screen 23—23 from the main array. In Fig. 5, the transmitter is at 20 and the reflective-absorber means at 18 and 19 properly disposed with respect to the main directive aerial array 21, 21A.

In this instance when both the side screens 22—22, 23—23 are effective (reflective-absorbers or rejective), there is very litttle beam formation or propagation of the electromagnetic energy from the central directional array 21—21A.

Now, if side screen 23—23 is rendered effective, while the side screen 22—22 is put out of action or rendered in resonance with the central beam array, by making rods 22—22 resonate at a higher frequency than that of the main radiator or by direct connection to the transmitter, then there is produced a deformed beam as indicated in Fig. 2 with a straight-edge along the axis marked X and the curved side along the axis marked Y.

Alternately, if side screen 23—23 is rendered in resonance by making the rods resonate at a higher frequency than that of the main radiator or by connecting it with the transmitter, or if this screen is put out of action, then there is produced a deformed beam with the straight edge along the axis Y, the curved side being along the axis X.

Furthermore, by transmitting energy and modulating it vocally with "Croy" or the letter "A" in Morse code when the side screen 23—23 only is effective, a lop-sided beam formation modulated vocally with "Croy" or the letter "A" in Morse code is provided on the right approach side.

Alternatively, by transmitting energy and modulating it vocally with "Don" or the letter "N" in Morse code when the side screen 22—22 only is effective there is produced a lop-sided beam formation modulated vocally with "Don" or the letter "N" in Morse code on the left approach side.

If two transmitters are used coupled individually to each array referring to Fig. 3, then it is a simple matter to synchronize the two transmitters by a modulating-switching arrangement, referred to later in the specification in order to render the left transmitter "out of action" while the right modulated transmitter is transmitting or vice versa.

Preferably, one transmitter is used and the modulating-switching gear, referred to later in the specification, in effect modulates the central aerial beam array as in Fig. 5 with the syllable "Croy" or the letter "A" in Morse code at the same time screen 22—22 is rendered effective with the aid of electromagnetic relay switches by connecting the various screen elements (coil, rods, screen or counterpoise,) to earth, and side screen 23—23 is ineffective, or in resonance with the central beam transmitting array 21—21A.

The next moment the same modulating-switching gear in effect modulates the central beam array with the syllable "Don" or the letter "N" in Morse code at the same time the side screen 23—23 is made effective, the side screen 22—22 being made ineffective or in resonance with the main beam array 21—21A.

This method of modulating and switching creates a central approach corridor as the shape of the polar patterns changes every instant. A hunting zone modulated "Croy" is formed on the right side of the central axis, another hunting zone being created the next instant and modulated with the word "Don" on the left side of the central approach axis, with the formation of a central approach zone indicating the phonic signal "Croydon" to the approaching chaft.

Another feature of the invention is that by the aid of the phonic modulating arrangement, the descent commencing and the boundary marker beacons, instead of transmitting high or low pitched dots and dashes, transmit, for example, low pitched "Descent commencing beacon" or "Commence descent" and quick very high pitched "Boundary" or "Crossing boundary."

Further, the A, N in Morse code may be transmitted in conjunction with phonic "Croydon" superposed on the A, N signals or intervening during a short period when the A, N signals are not being transmitted. This is all achieved by the aid of the modulating-switching gear hereinafter described:

The simplest method of modulating-switching can be conducted with a gramophone record and associated motor which by suitable gearing can effect the various switching arrangements. It was found, however, that this method would be impracticable in view of the wear and tear that is caused in the record due to the continuous day and night use to which the apparatus would in all probability be placed under normal working conditions.

A simple arrangement comprising a continuous magnetized steel band or wire or a continuous recorded film arrangement was employed as is shown diagrammatically in Fig. 6 of the accompanying drawings. 26, 26 represents a magnetized steel band or an ordinary film recorded with the words "Croy" and "Don" running over spool 25 and pulleys 27, 28. Pulley 28 is coupled through a reduction gearing to an electric motor and provided with cams or raised surfaces 29, 29 which close the electromagnet circuit 31 through contacts 30. Such an electromagnet arrangement 31 actuates contacts 31a, etc., which are connected as indicated to each side screen rod as represented by 16, 16 in Fig. 4; the contact making process synchronizing with the passage of the particular part of the band or film with the recorded "Croy" or "Don" or A,N, through the sound head indicated generally at 33. The light sensitive cell 34 (in case of the recorded film) emits electrons in proportion to the intensity of the light passing through the aperture 33a of the sound head from a constant light glow lamp 32, the current being supplied from a trickle charged battery or a generator. The resultant currents after amplification are fed to the oscillator circuits for modulation.

It will be seen by reference to Fig. 2 that in order to form an approach corridor it is not necessary to employ two reflector screens alternatively operative, as provided in Fig. 5, but that it is sufficient if one screen is provided, as in Fig. 4, the corridor being formed by the overlapping portions of the normal field formation, shown dotted in Fig. 2, and the deformed field produced when the array 16, Fig. 4, is operative. This arrangement is not as satisfactory as that of Fig. 5, which produces a narrower corridor, but may be sufficient for simpler installations where less precision is required due to larger landing facilities.

A continuous film or steel band may be used, or a long length of the band or film may be employed, a special known self reversing spool being used in this instance.

It is better, however, to use a drum for supporting the film or the steel band. This method has several advantages over any other method. Such an arrangement is shown in the accompanying Fig. 7.

An electric motor 44, supporting a slotted drum 41, revolves at a predetermined speed of about 60 to 80 revolutions per minute. 38, 39, 40 represent slots on which the recorded film or the magnetized wire is superposed.

36 represents a baffle plate supporting the light-sensitive cell 37. 42 represents a constant light source and associated optical system mounted on an adjustable tripod 43 for cooperation with a selected film. The intensity of light from lamp 42 varies as the drum revolves and depends on the recording on the selected film; and accordingly the light-sensitive cell emits electrons which after amplification are fed to the transmitter oscillator circuits.

Fig. 8 shows a horizontally arranged drum 45, bearing recorded bands or films 46, 47, 48 and actuated by motor 50 through reduction gearing 49. Light sensitive cell 51 is coupled to the amplifier 52 which is mounted on wheels or rollers so that glow lamp 54 with its associated optical system may be brought beneath film 46, 47 or 48 by sliding the chassis. In a better arrangement each strip is provided with its individual lamp-optical system so that any particular strip can be brought into action from the control tower by just switching on the lamp associated with the particular strip. Strip 46 may bear the recorded syllable "Croy", strip 47 the syllable "Don" and strip 48 "Croydon" or "Do not land". When strip 48 is brought into action, both side screens 22—22 and 23—23 of Fig. 5 are put out of action, so that there is a single central undeformed beam formation transmitting "Croydon" or "Do not land" or a similar instruction, information or message.

Fig. 9 is a further modification of the arrangements shown in Figs. 7 and 8.

A hollow stationary axle 66, supported by pillars 67, 67 is provided with roller bearings as at 64, around which revolves the slotted drum 59 with films 60, 61, 62, 63, mounted to cover the slots.

The drum is preferably in two halves hinged to one another being rotated by motor 72 through suitable pulleys sprocket-chain or reduction gearing 74. The motor 72 also drives a 6 or 12 volt generator 73 which may supply the energizing current to the various electromagnets and glow-lamps. In lieu of the motor-generator set batteries may be used for energizing the several electromagnets and glow-lamps.

The drum bears contact strips 75, 75 which are shorted by brushes 57 as the drum revolves thus energizing the electromagnet 56, the current being supplied by battery 55 or motor-generator 73. One electromagnet contact maker or breaker switch 56a, 56b, etc., is coupled to each rod element comprising screen 22—22 and 23—23 of Fig. 5.

This may also be achieved by cams 58—58 actuating suitable switching means. A single or a series of light-sensitive cells 68—68 and the associated optical systems 77—77 are supported by cradle 76—76 coupled to the hollow stationary support or axle 66.

Several glow-lamps 69—69 fed from a battery or generator 73 are associated with the films 60, 61, 62, 63, each of which bears a recorded word or message on the film (or a magnetized band may be used).

By a rotary switch any particular strip or combination of strips actuated by lamps 69—69 can be thus brought into action from the control tower, so that the light-sensitive cells 68—68 generate electrons which are fed by cable 65 to amplifier 70 and eventually led from the output terminals 71 to the oscillator after amplification to be transmitted by the transmitter in synchronism with the particular side screen being made effective as has been referred to previously.

It will be quite apparent that instead of the light-sensitive cell being inside the drum, the arrangement may be reversed and the glow-lamp could be placed there instead.

The drum arrangement can also transmit A, N in Morse code by the light-sensitive cell arrangement instead of by direct keying, and run for months without attention or showing any signs of wear or tear in the apparatus.

In the case of micro-rays it is possible by the aid of tilting arrangements comprising ball and socket joints to transmit the energy in any desired direction.

The design of the receiver is such that during the hunting operation for the central corridor, the receiver circuit can be made very sensitive. Once the central approach corridor is located, the sensitivity of the receiver may be reduced by, say 50%. This procedure helps to restrict the pilot to the true and narrow central corridor.

It will be understood that the embodiments of my invention shown and described in the foregoing specification are intended to be illustrative only, and that modifications may be made within the scope of the appended claims.

What I claim as new and desire to secure by Letters Patent of the United States is as follows:

1. A radio transmitting arrangement comprising a directive antenna array including a radioator element and a series of director elements; a high frequency generator coupled to said radiator element for producing an elongated beam of energy emanating from said array; deflective antenna means substantially coextensive with and disposed in spaced relation to said directive antenna array so as, when effective, to deform the radiation pattern of the energy emanating from said directive antenna array; and modulating-switching means including different signal sound records, modulating sound reproducing means operable from said records, and commutator switching means connected with said deflective antenna means, means for connecting said sound reproducing means with said generator for modulating the energy radiated from said directive antenna array by different signals from said sound records, and means for controlling said commutator switching means from said sound reproducing means for simultaneously and synchronously controlling the operation of said deflective antenna means for providing alternately separate field zones for the different signals in said radiated energy, said zones having narrow edge portions thereof overlapping so as to form a corridor of constant field intensity.

2. The method of establishing in space a field of electromagnetic energy identifying the approach to an unknown aircraft landing field which comprises maintaining in space directional alternate beams of electromagnetic energy overlapping a narrow middle zone constituting an approach corridor to the landing field, and independently vocally modulating the beams by different syllabic portions of the name of the landing field, creating thereby an interlocked phonic signal comprising the full name of the landing field in the approach corridor to said landing field.

3. The method of establishing in space a field of electromagnetic energy identifying the approach to an unknown aircraft landing field which comprises directively propagating in space a beam of electromagnetic energy, alternately establishing an electromagnetic field of energy on each side of the directively propagated beam of electromagnetic energy, reflecting the said directively propagated beam of energy from side to side by the alternate effect of the electromagnetic fields of energy on either side of the directively propagated beam of energy, and independently vocally modulating the beam of electromagnetic energy in synchronism with the alternate effect of the different electromagnetic fields of energy by different syllabic portions of the name of the landing field, creating thereby an interlocked phonic signal comprising the full name of the landing field in a zone constantly traversed by said beam.

DEVENDRA NATH SHARMA.